March 17, 1959 R. L. MOORE ET AL 2,877,958

MAGNETIC SOUND RECORDER-REPRODUCER

Filed June 16, 1952 8 Sheets-Sheet 1

Inventors.
Robert L. Moore.
Sheldon Lee Pastor.
By Zabel, Baker, York, Jones & Dithmar
Attorneys.

March 17, 1959

R. L. MOORE ET AL 2,877,958

MAGNETIC SOUND RECORDER-REPRODUCER

Filed June 16, 1952

8 Sheets-Sheet 2

Inventors.
Robert L. Moore.
Sheldon Lee Pastor.
By Zabel, Baker, York, Jones & Dithmar
Attorneys.

Inventors.
Robert L. Moore.
Sheldon Lee Pastor
By Zabel, Baker, York, Jones & Dithmar
Attorneys.

MAGNETIC SOUND RECORDER-REPRODUCER

Filed June 16, 1952 8 Sheets-Sheet 4

Inventors
Robert L. Moore.
Sheldon Lee Pastor.
By. Zabel, Baker, York, Jones & Dithmar
Attorneys.

Inventors.
Robert L. Moore.
Sheldon Lee Pastor.
By Zabel, Baker, York, Jones & Dithmar
Attorneys.

March 17, 1959 R. L. MOORE ET AL 2,877,958

MAGNETIC SOUND RECORDER-REPRODUCER

Filed June 16, 1952 8 Sheets-Sheet 6

Inventors.
Robert L. Moore.
Sheldon Lee Pastor.
By Zabel, Baker, York, Jones & Dithmar
Attorneys.

Fig. 13.
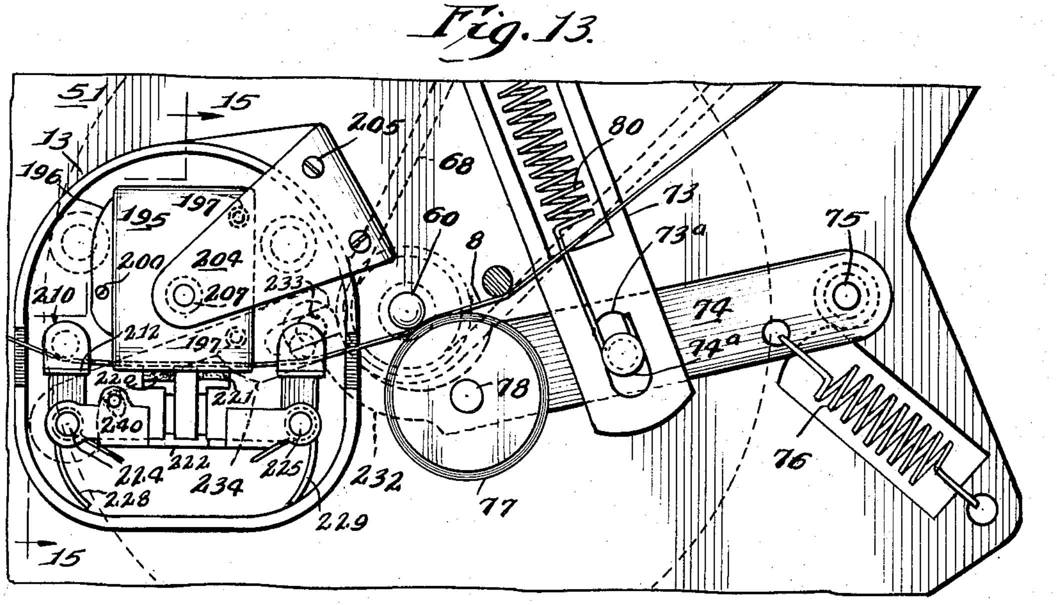
Fig. 14.
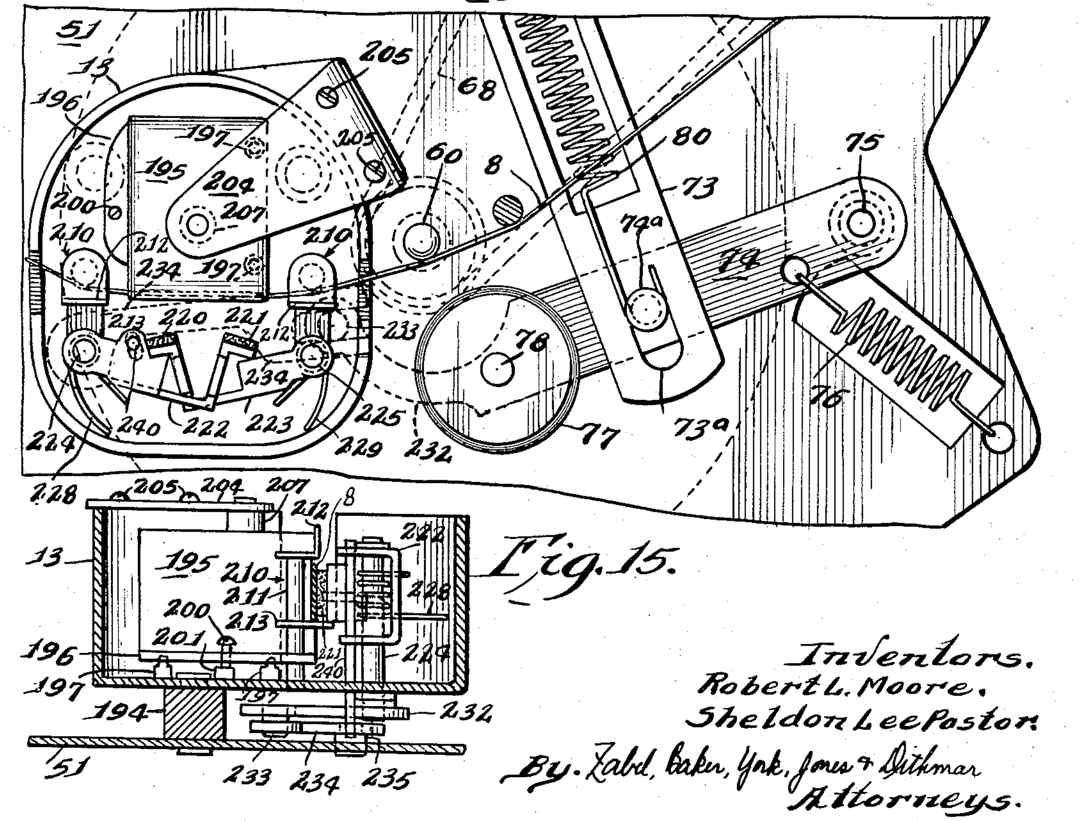
Fig. 14, Fig. 15.
Inventors.
Robert L. Moore.
Sheldon Lee Pastor.
By. Zabel, Baker, York, Jones & Dithmar
Attorneys.

Inventors.
Robert L. Moore.
Sheldon Lee Pastor.
By Zabel, Baker, York, Jones & Dithmar
Attorneys.

2,877,958
Patented Mar. 17, 1959

2,877,958

MAGNETIC SOUND RECORDER-REPRODUCER

Robert L. Moore, Park Forest, and Sheldon Lee Pastor, Chicago, Ill., assignors to Revere Camera Company, Chicago, Ill., a corporation of Delaware Application June 16, 1952, Serial No. 293,814
7 Claims. (Cl. 242—55.12)

Our invention relates to a magnetic sound recorder-reproducer which utilizes magnetic tape or wire as the record medium. For convenience, the record medium will be referred to herein as tape.

The invention concerns itself primarily with mechanical features of the recorder-reproducer; it does not relate to electronic components.

The mechanical features of the recorder-reproducer falling within our invention comprise, essentially, various control members, and elements that function to drive and stop the tape (without spilling) in response to the control members. The tape, as will be seen, is adapted to be driven selectively at two different speeds, (1) slow speed for "record" and "play" (reproduce), and (2) fast speed for "rewind" and "rapid forward." The quoted words denote the several major tape driving functions performed by the machine.

As one important feature of the invention, each tape driving function is initiated by an individual control member. Accordingly, extreme simplicity of machine operation is provided, and the likelihood of improper and damaging operation is substantially eliminated. In other words, an untrained or unskilled individual can easily and safely operate our machine properly.

Generally speaking, it is possible to shift from one operating function of the machine to any other proper operating function by the manipulation of only one control member. This simplifies machine operation, provides for speed of shifting, and permits certain proper functions to be performed simultaneously.

Another important feature of the invention is the provision of substantially separate drive systems for the slow and fast speed drives. This feature cooperates to insure a high degree of accuracy and uniformity in the slow speed rate of tape travel by reducing the amount of loading necessary. In other words, since the power requirements for slow speed drive are relatively low, load variations have a minimum effect on the critical rate of slow tape speed. This feature also significantly increases the mechanical efficiency of the drive systems.

The separate drive feature also makes possible the elimination of certain friction clutches that heretofore have normally operated with a slippage equal to the difference between the slow and fast driving speeds. One objection to such large clutch slippage is that the drag thereof produces a distortion (stretching) of the tape, and this distortion adversely affects the over-all audio characteristics of the recorder-reproducer. Also, a large amount of slippage makes it difficult to accurately control the slow speed rate.

Another feature of the invention is the use of a solenoid and plunger device that furnishes a large portion of the mechanical energy necessary to shift the drive elements of the machine from one driving function to another. Heretofore this energy has been furnished by the person operating the machine, a factor that has complicated machine operation. This arrangement enables the machine to be operated by remote control, if desired. The solenoid device also effects automatic disengagement of certain drive and driven elements of the drive systems when the machine is not in operation. This avoids the formation of objectionable "flat spots" on the engaging surfaces of such drive and driven elements.

Other important features of the invention deal with the problem of tape spilling. In our machine it is virtually impossible for spilling to occur.

The machine is provided with a series of interlocks which makes it impossible to perform machine functions in improper sequence.

Certain features disclosed but not claimed herein form the subject matter of copending divisional application, Serial No. 787,096, filed December 22, 1958.

Other features and advantages of our invention will be apparent as the description proceeds, reference being had to the accompanying drawings which illustrate one structural form of the invention. It is to be understood, of course, that in commercial applications of the invention various details might well vary somewhat from those here shown and described.

In the drawings:

Fig. 13 is an enlarged plan view of a portion of Fig. 2 showing the elements in tape driving position;

Fig. 14 is a view like Fig. 13 with the elements in non-tape driving position;

Fig. 15 is a sectional view on line 15—15 of Fig. 13;

Figure 1:
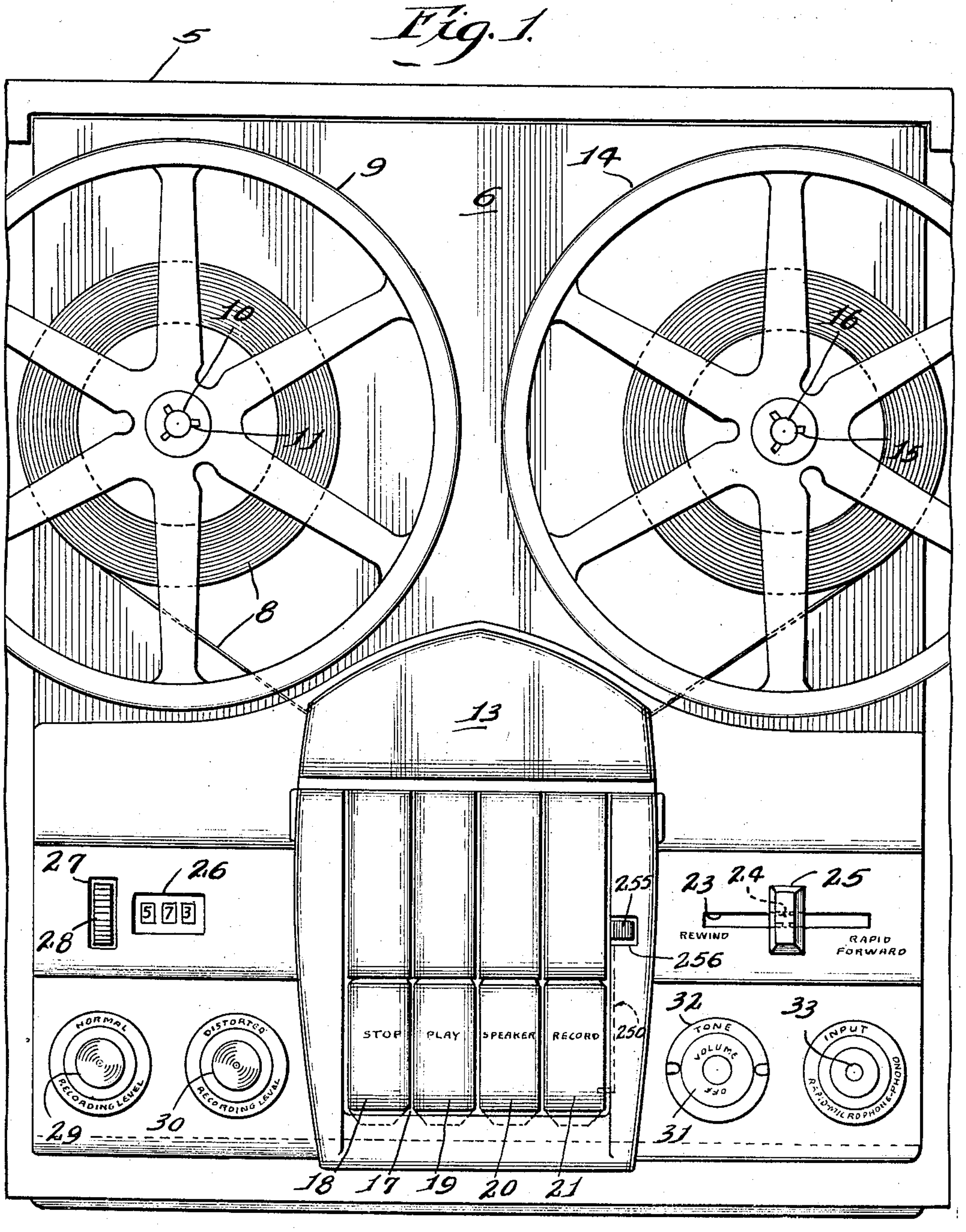
Fig. 1 is a top view of a portion of the recorder-reproducer illustrating the various control members.

Referring first to Fig. 1, the recorder-reproducer of our invention is contained in a suitable cabinet or housing 5. The top of housing 5 is enclosed by a removable panel 6. The various control members and elements that must be manipulated during operation of the recorder-reproducer are located on the top of panel 6.

The recording medium, in this instance magnetic tape 8, is carried on a storage reel 9 that in turn is mounted on a spindle 10 projecting through panel 6. Reel 9 is keyed to spindle 10 as shown at 11.

Tape 8 is wound counter-clockwise on storage reel 9, and it extends through a sound head housing 13 to a take-up reel 14. This latter reel is keyed at 15 to a second spindle 16 that also projects through panel 6.

Four adjacent control keys project through an opening 17 located in the front, central potrion of panel 6. Each key controls one of several operating functions performed by the recorder-reproducer. Reading from left to right in Fig. 1, the keys are identified as stop key 18, play key 19, speaker key 20 and record key 21. The respective keys and their associated mechanisms will later be described in detail.

To the right of the control keys, panel 6 is provided with an elongated slot 23 through which projects an arm 24. A knob 25 is mounted on the end of arm 24. Knob 25 is the control element for two functions of the machine, namely the rewind function and the rapid forward function.

At the conclusion of a recording operation, the recorded portion of tape 8 appears on take-up reel 14. Before the tape can be played back, it must be rewound on storage reel 9. The rewind mechanisms in the machine performs this function, and they are under the control of knob 25. When knob 25 is manually moved to the left (the direction in which the tape moves in rewind), storage reel 9 is driven in a clockwise direction and the recorded tape is rewound on storage reel 9.

The rapid forward function, also controlled by knob 25, is provided so that a desired length of tape on storage reel 9 may quickly be oriented for recording or playing. In other words, the rapid forward function of the machine makes it possible to quickly "cue" the tape. It will be noted that for rapid forward the knob 25 is moved to the right, the same direction in which the tape moves during this function.

As previously mentioned, tape 8 is adapted to be driven selectively at two different speeds. During the play and record functions, controlled by keys 19 and 21 respectively, the tape is driven at a relatively slow speed. During the rewind and rapid forward functions, controlled by knob 25, the tape is driven at a fast speed.

The slow speed rate of tape travel is highly critical; it must be confined to close limits, i. e. 0.2%. Our machine is designed so that a simple change in one or two parts is all that is necessary to provide an accurate slow speed rate of 1⅞, 3¾ or 7½ inches per second. The fast speed, of course, is not critical, and it is many times that of the slow speed.

To complete the discussion of Fig. 1, a rectangular opening 26 is provided in panel 6 at the left of the control keys. The indicators of a counting mechanism are positioned so as to be seen through opening 26. This mechanism makes it possible to accurately index the material contained on the tape, and to "cue" the tape for reproducing desired material. To the left of opening 26 is an opening 27 through which projects a knob 28 that is used to set the indicators.

On the front of panel 6 at the left are provided lamps 29 and 30 that provide conventional recording level indications. At the right on panel 6 is provided a knob 31 for the off-on-volume control, and concentric therewith is a tone control knob 32. Adjacent thereto is a jack 33 for a conductor leading to a microphone or other source of audio input such as a radio or phonograph.

*Function keys*

To facilitate understanding of our invention, the various function keys and their immediately associated apparatus will now be described. The keys and associated apparatus are best illustrated in Figs. 16, 17, 18 and 19 (last sheet of drawings).

Figures 16, 17, 18, 19:
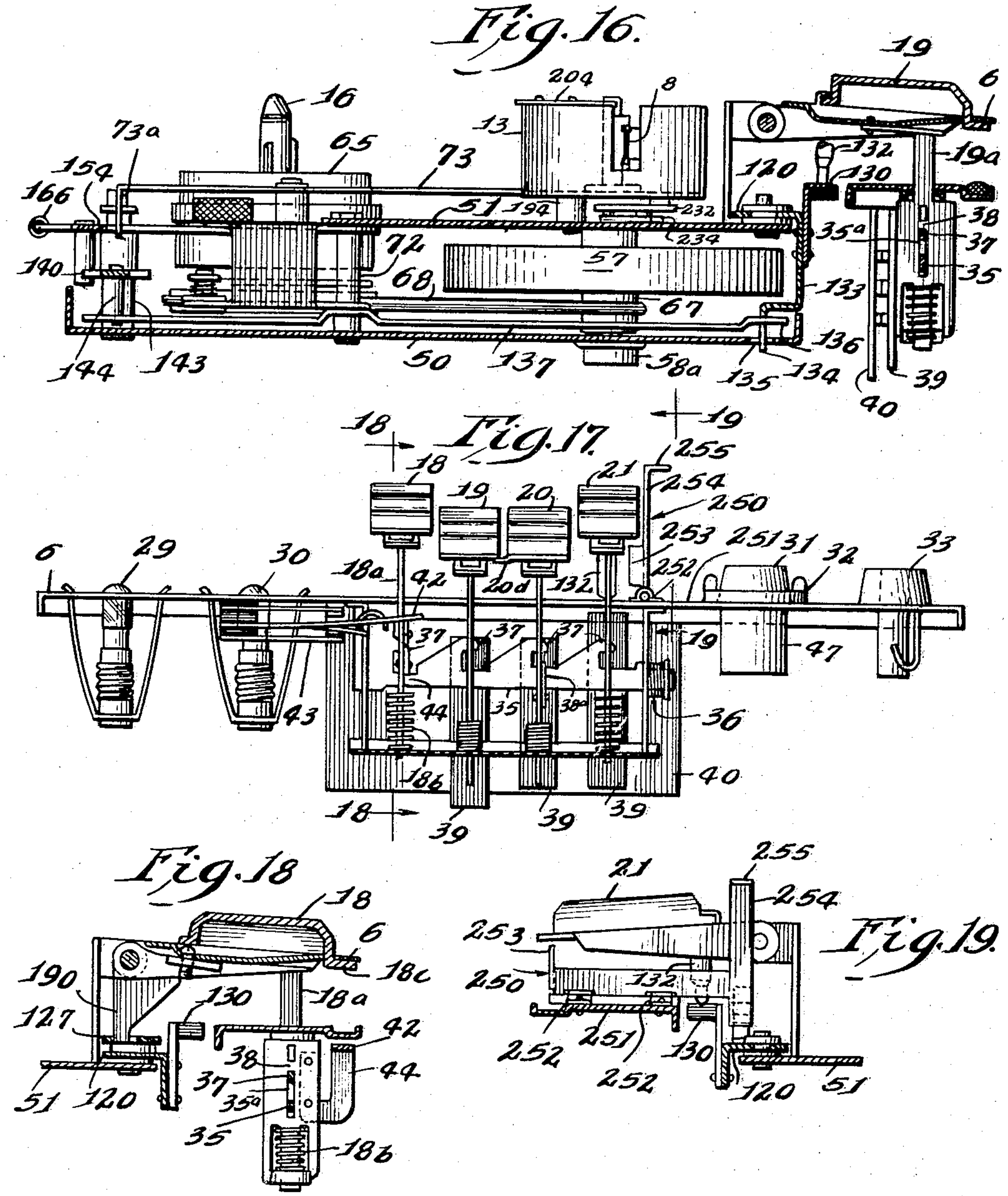
Fig. 16 is a sectional view on line 16—16 of Fig. 2.
Fig. 17 is a front elevational view taken on line 17—17 of Fig. 2.
Fig. 18 is a sectional view on line 18—18 of Fig. 17.
Fig. 19 is a sectional view on line 19—19 of Fig. 17.

Referring to Fig. 17, stop key 18 bears on the top of a stem **18*a*. The latter, as best shown in Fig. 18, has a spring 18*b* that biases the stem upwardly. It will be noted that key 18 has a lug 18*c* (Fig. 18) that engages the under surface of panel 6** to limit upward movement of the key.

The play, speaker, and record keys, respectively numbered 19, 20 and 21, each have stems, bias springs and position limiting lugs like those of stop key 18 described above.

A latch bar 35 (Fig. 17) extends through aligned apertures **35*a* in the several key stems. A spring 36 biases latch bar 35** to the right.

Latch bar 35 has a plurality of cam fingers 37, one for each key stem, and each key stem has a finger engaging cross bar 38 (Figs. 16 and 18) extending across its aperture **35*a*. When stop key 18, for example, is depressed, cross bar 38 engages the cam surface of finger 37 to move latch bar 35 to the left. Further "down" movement of key 18 brings cross bar 38 below finger 37 whereupon bias spring 36 moves the latch bar to the right. Finger 37 on latch bar 35 at this time overlies cross bar 38, thereby holding stop key 18 in the "down" position. It will be noted that when latch bar 35 is moved to the left, as it is when key 18 is depressed, any finger 37** that is holding any other key in "down" position is withdrawn so that the spring of that key may move the key to its "up" position.

Play key 19 (Fig. 16) and record key 21 have their stems provided with apertures and cross bars such as those illustrated and described above in connection with stop key 18. The stem of speaker key 20 has a similar aperture but the cross bar thereof is carried by a resilient spring **38*a* (Fig. 17). Spring 38*a* yields when the cross bar engages cam finger 37 so that the bar is incapable of moving latch bar 35 to the left, but the bar is effective to lock the key in "down" position. Therefore, speaker key 20** can be depressed when desired without releasing any other "down" key.

The stems of keys 19, 20 and 21 carry terminal strips 39 (Figs. 16 and 17) which with fixed terminal strip 40 form electric switches. These switches control the electronic components of the recorder-reproducer.

Stop key 18 is operatively related to actuator 42 (Fig. 17) of an electric switch 43. Stem **18*a* of key 18 carries an arm 44 (Fig. 18) that operatively engages switch actuator 42 when the stem travels to its "up" position. Switch 43 may be of the snap type wherein a spring normally biases the switch to open circuit condition, and wherein the actuator is moved against the spring to close the switch. When stop key 18 is depressed and held in "down" position by latch bar finger 37, the bias force opens the switch. When the stop key travels upwardly, arm 44 moves actuator 42 to open the switch. It is to be noted that arm 44 is of such length that switch 43 opens on the down stroke of stop key 18 before latch bar 35** is moved to release other "down" keys.

Switch 43 is connected in circuit with a solenoid 45 (Figs. 2 and 5) which, as will be seen, provides the energy needed for performing certain function shifts of the mechanism. When stop key 18 is held in its depressed position, switch 43 is in open circuit condition, and solenoid 45 is deenergized. The shifting elements actuated by the solenoid 45 are, when the solenoid is deenergized, in "neutral," as will be seen.

The motive power for driving the mechanism is provided by an electric motor 46 (Figs. 2 and 5) that is turned on and off by switch 47 (Fig. 17). The latter is actuated by the previously mentioned knob 31 on the face of panel 6. Switch 47 is first turned "on" to energize motor 46 before any tape driving function can be initiated by the function keys.

Assuming the machine is stopped (stop key 18 is depressed), and it is desired to shift the machine into its play (reproduce) function, play key 19 is manually depressed. This action, as previously mentioned, shifts latch bar 35 to the left and releases the "down" stop key 18. The latter is pushed upwardly by bias spring **18*b*, and arm 44 carried on stem 18*a* moves switch actuator 42 to close switch 43 and energize solenoid 45**. As will later be seen, solenoid action establishes a drive system which moves the tape at the proper speed for the play function.

Speaker key 20 (Fig. 17) has a lug **20*d* that extends beneath play key 19 so that depressing the latter also depresses speaker key 20. The electric switch 39, 40** associated with speaker key 20 merely connects the audio amplifier of the unit to the loud speaker, as is necessary when the machine is to operate in the play function.

By reason of this separate speaker key and associated switch, it is optional with the user as to whether or not material being recorded is heard through the loud speaker. If the material to be recorded is derived from a microphone, speaker key 20 usually is not depressed since there is no need to monitor such material. On the other hand, if the material to be recorded is derived from a radio or phonograph, it may be desirable to depress speaker key 20 to permit monitoring. Speaker key 20 also enables the recorder-reproducer to be used as a public address system. Also, the ability to separately establish the speaker circuit is useful in "cuing" the tape, particularly where a tape is not indexed. When the machine is operated in rewind or rapid forward, a high pitched sound when the speaker key is depressed indicates the presence of recorded material on the portion of the tape then passing through the sound head. If there is no sound, there is no recorded material.

Record key 21 is depressed when it is desired to shift the machine to the record function. As previously mentioned, this releases any other "down" key. If stop key 18 is in "down" position, it is, of course, released to energize solenoid 45 which in turn shifts the mechanism to drive the tape at the proper speed for the record function.

With the above described key arrangement, it is possible to shift directly from play to record, or vice versa without going through a separately controlled stop position.

Having thus generally described the various control keys, and the functions initiated by each, we now will describe the elements that cooperate in response to the keys to drive and stop the tape in the respective functions.

*Record and play functions*

Figure 2:
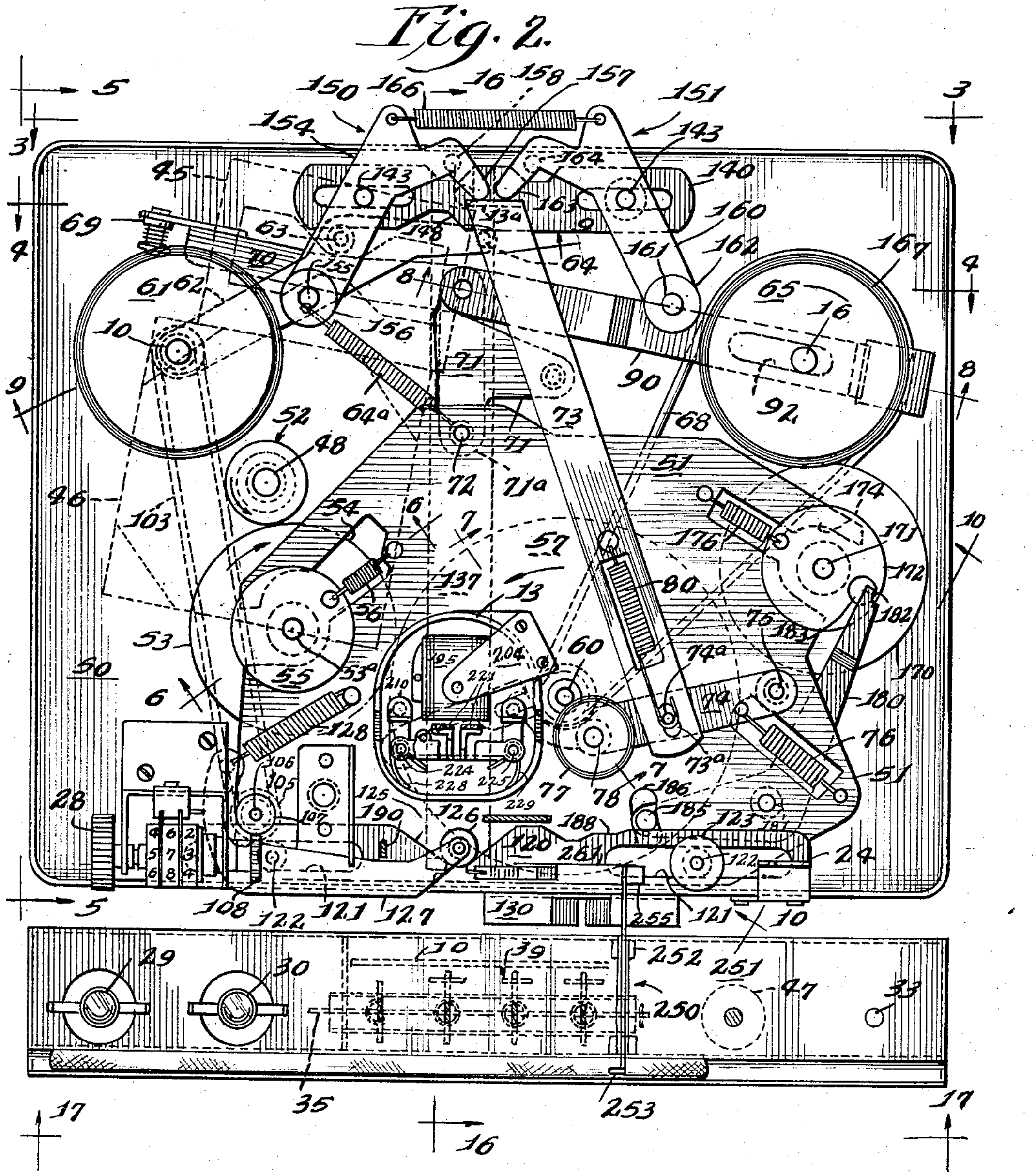
Fig. 2 is a plan view of the machine with the top panel and cabinet removed.
Figure 11:
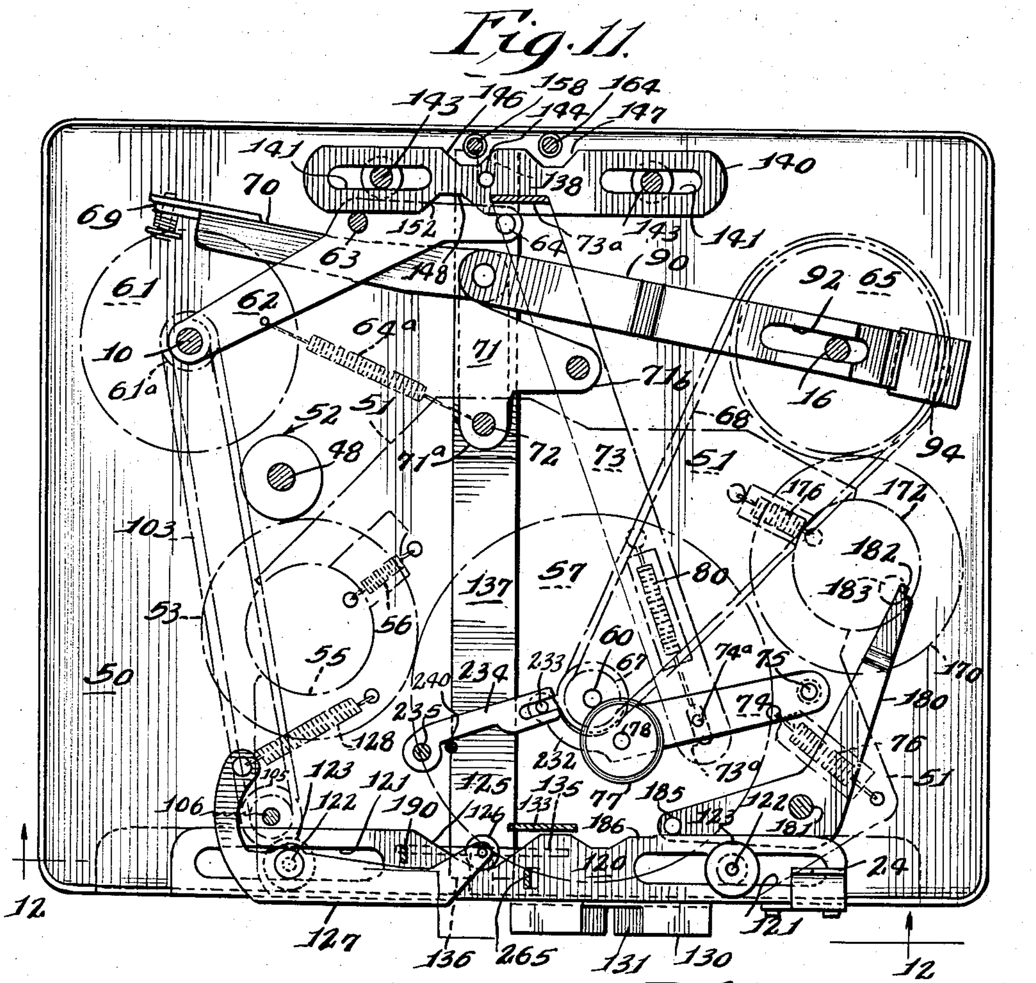
Fig. 11 is a horizontal sectional view through a portion of the machine with certain elements located above the section plane being illustrated in a phantom manner.

The elements that cooperate to drive the tape during the record and play functions are shown in assembled relation in Figs. 2 and 11. The separate elements involved in the rewind and rapid forward functions also are shown in these figures, but for the most part they will be described under a separate heading.

Referring first to Fig. 2, the various elements are mounted on, below, or between two mounting plates, (1) a lower plate 50 which is generally co-extensive in size with cabinet 5 and (2) a smaller upper plate 51. Both plates are horizontally disposed, and upper plate 51 is positioned about an inch above lower plate 50.

Figures 5, 6, 7:
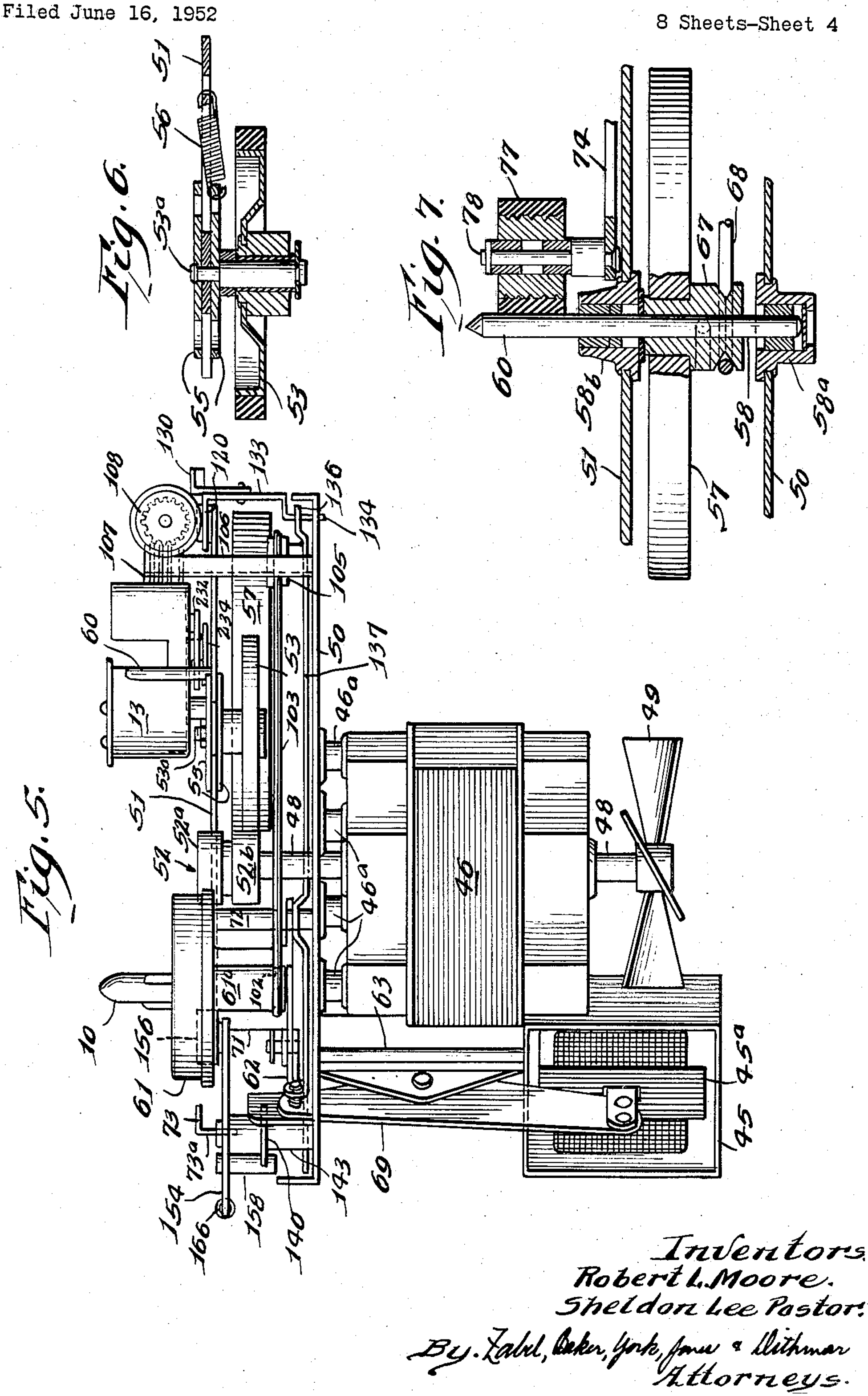
Fig. 5 is a sectional view on line 5—5 of Fig. 2.
Fig. 6 is a sectional view on line 6—6 of Fig. 2.
Fig. 7 is a sectional view on line 7—7 of Fig. 2.

The electric motor 46 that furnishes the motive power for the tape driving mechanism is mounted below plate 50, as best shown in Fig. 5. Motor supports **46*a* extend between plate 50 and the motor. A motor shaft 48 extends vertically through the motor and projects beyond the motor ends. A motor cooling fan 49 is mounted at the lower end of shaft 48**.

The upper end of motor shaft 48, still referring to Fig. 5, projects through lower plate 50 and extends to a point slightly above the plane of upper plate 51. The upper end of shaft 48 carries a motor roller 52 that rotates with the shaft. As illustrated in Fig. 5, motor roller 52 has two portions, an upper portion **52*a* and a lower portion 52*b***.

An intermediate roller 53 is mounted between plates 50 and 51, and it is arranged to be constantly in engagement with lower portion **52*b* of motor roller 52. Intermediate roller 53 is carried by upper plate 51 in a "floating" fashion. As best illustrated in Figs. 2 and 5, upper plate 51 has an elongated slot 54 through which passes a vertical shaft 53*a* that rotatably carries intermediate roller 53. The upper end of shaft 53*a* carries a pair of spaced disks 55, the space between the disks being slightly larger than the thickness of upper plate 51. Portions of plate 51 at the sides of slot 54 are sandwiched between disks 55, thereby enabling shaft 53*a* and intermediate roller 53 to "float" with respect to plate 51. Fig. 6 is an enlarged view showing the details of this arrangement. A spring 56 extends between one of the disks 55 and plate 51 to bias intermediate roller 53 into engagement with lower portion 52*b* of motor roller 52** and a flywheel, presently to be described.

Still referring to Figs. 2 and 5, and Fig. 7, an inertia member or flywheel 57 is mounted between plates 50 and 51. Flywheel 57 is fixed on a vertical shaft 58 that is journalled at its lower end in a bearing **58*a* carried by lower plate 50. The upper portion of shaft 58 extends through bearing 58*b* in upper plate 51, and it projects some distance beyond this latter bearing. The upper end of flywheel shaft 58 terminates in a portion that hereinafter will be called capstan 60. As will later be seen, capstan 60** is the element that drives the magnetic tape at uniform slow speed through the sound head of the recorder-reproducer during the play and record functions.

As previously mentioned, intermediate roller 53 is constantly biased by spring 56 into engagement with motor roller portion **52*b* and the periphery of flywheel 57. Therefore, at all times during operation of motor 46, flywheel 57 is driven, the elements of this drive train being motor shaft 48, motor roller portion 52*b* and intermediate roller 53. Looking at Fig. 2, motor shaft 48 and flywheel 57** both rotate in a counterclockwise direction (arrows).

Referring back to Fig. 1, storage reel 9 is keyed to spindle 10. The reel rests on storage reel roller 61 (Figs. 2, 5 and 9) which is fixed to spindle 10, and which has a tubular bearing **61*a* aligned with the spindle. A shaft 10*a* which telescopes bearing 61*a*, is carried at one end of a lever 62, best shown in Fig. 9. Lever 62 is mounted intermediate its ends on a rotatable vertical shaft 63 extending through lower plate 50. The other end of lever 62 is provided with an upstanding stop pin 64 (Figs. 3 and 5), while a spring 64*a* (Figs. 2 and 11) biases lever 62** in a counterclockwise direction.

Figure 8:
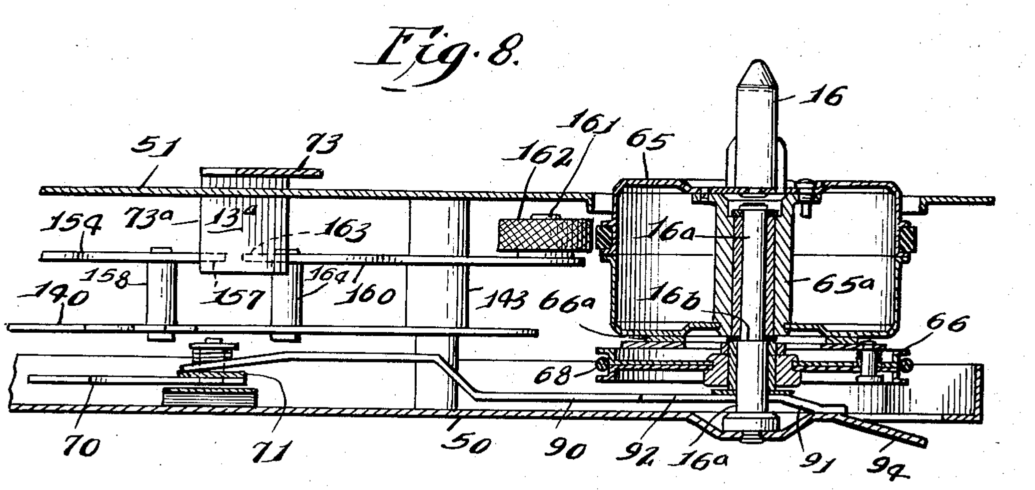
Fig. 8 is a sectional view on line 8—8 of Fig. 2.

Take-up reel 14, as previously mentioned, is keyed to spindle 16. It rests on take-up reel roller 65 which is fixed to spindle 16. This construction is best shown in Fig. 8. Take-up reel roller 65 has a tubular bearing **65*a* that telescopes a shaft 16*a* aligned with spindle 16. Shaft 16*a* is carried by plate 50, and it has a shoulder 16*b* on which bearing 65*a* rests. Thus roller 65 is vertically positioned on shaft 16*a*** and it is rotatable thereon.

A take-up reel pulley 66 is rotatably carried on shaft **16*a* below roller 65. The hub of pulley 66 rests on a vertically adjustable member, later to be described, whereby the pulley is movable to and from roller 65. Friction material 66*a* is disposed between roller 65 and pulley 66 to form a friction clutch that is engaged when pulley 66 is moved toward roller 65 and disengaged when the two members are separated. Thus pulley 66 is the drive element of the clutch and roller 65** is the driven element.

Figures 9, 10:
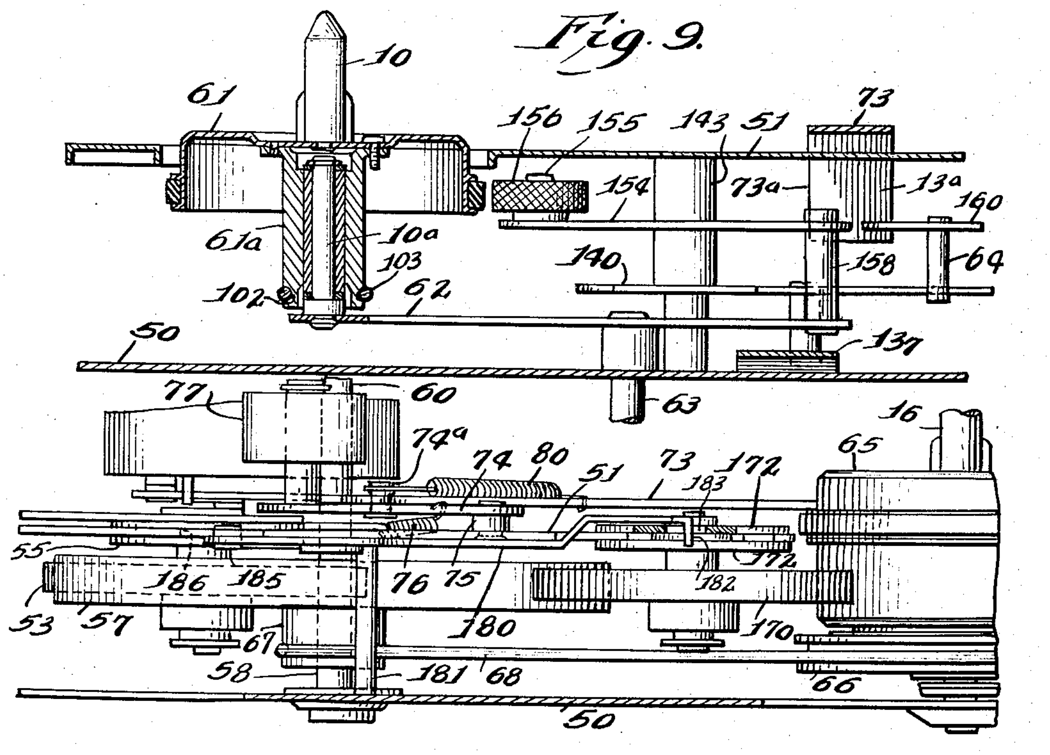
Fig. 9 is a sectional view on line 9—9 of Fig. 2.
Fig. 10 is a sectional view on line 10—10 of Fig. 2.

Referring to Figs. 7 and 10, rotatable flywheel shaft 58 has a pulley 67 positioned immediately below flywheel 57. A belt 68 connects pulley 67 with the pulley 66 that forms the drive element of the aforesaid friction clutch. Since flywheel 57 and shaft 58 rotate continuously during all driving functions of the machine, as has been stated, pulley 66 likewise rotates continuously at a uniform rate, and in a counterclockwise direction. The angular rate of rotation of pulley 66 is relatively slow, and it is equal to or slightly in excess of the maximum speed that must be given to take-up reel 14 in order to wind thereon the tape fed from capstan 60. Maximum speed of take-up reel 14 is needed when the diameter of tape on the reel is a minimum, and the speed thereafter decreases as the tape diameter increases, because the tape is fed from capstan 60 at uniform speed. Since take-up reel pulley 66 is driven at a uniform angular rate, it will be seen that there necessarily is a slight amount of slippage in the friction clutch formed by roller 65 and pulley 66. Because the clutch slippage is small, there is no appreciable loading force tending to disturb the uniform linear rate of tape travel as determined by capstan 60. Similarly, there is no tendency to distort the tape, a factor that contributes to the superior over-all performance of our machine.

Figures 3, 4:
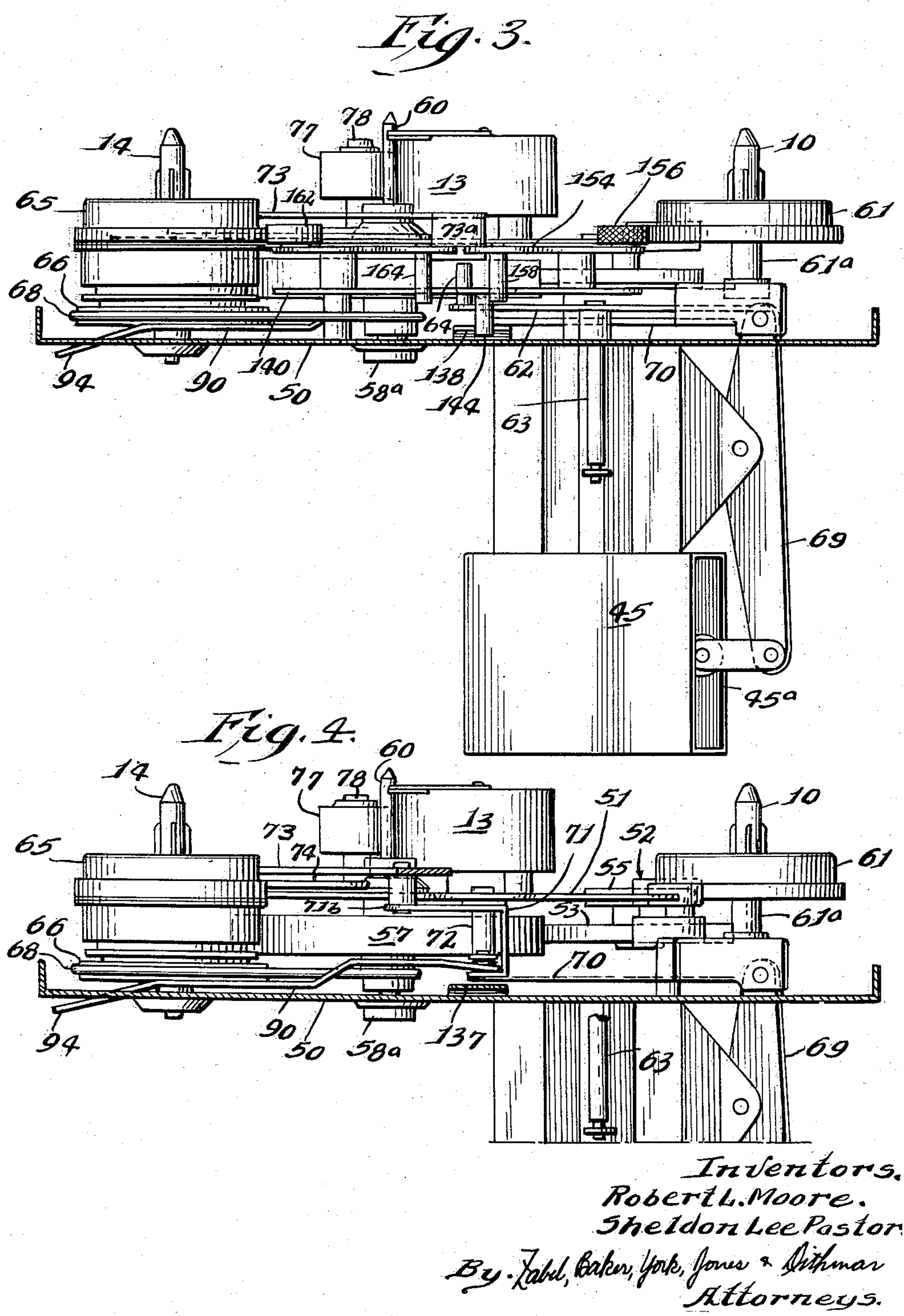
Fig. 3 is a rear elevational view of the machine taken on line 3—3 of Fig. 2.
Fig. 4 is a sectional view on line 4—4 of Fig. 2.

Referring to Fig. 3, movable element 45*a* of solenoid 45 is connected by a pivoted lever 69 to one end of a link 70. The latter extends above and parallel to lower plate 50, and it is best illustrated in Figs. 2, 4 and 11. The other end of link 70 is pivoted to a generally U-shaped link element 71. The U-shape of this link element is shown in Fig. 4. Link element 71 has an arm 71*a* (Figs. 2 and 11) that is pivoted on a pin 72 extending between lower and upper plates 50 and 51. Thus, the movement of element 45*a* is translated into back and forth longitudinal movement of link 70, and back and forth rotary movement of U-shaped link element 71.

U-shaped link element 71 has an arm 71*b* to which is pivoted a comparatively long link 73 (Figs. 2 and 11) that extends generally from the front to the rear of the machine. The pivot point is intermediate the ends of link 73. The end of link 73 toward the front of the machine is provided with an elongated slot 73*a*.

An arm 74 is pivoted at one end on a pin 75 carried by plate 51 (Figs. 2, 9 and 11) near the front end of link 73. Arm 74 has a stud 74*a* intermediate its ends which projects through elongated slot 73*a* of the link. A spring 76 biases arm 74 in a counterclockwise direction. Spring 76, it should be mentioned, is tensed when solenoid 45 is energized, and it furnishes the force to neutralize the drive train when solenoid 45 is deenergized.

As previously mentioned, capstan 60 is the element that drives tape 8 at its uniform slow rate through the sound head during the play and record functions. A pressure roller 77 (Figs. 2, 3, 4, 7, 10, 11, 13 and 14) cooperates with capstan 60 in bringing about this drive function. Pressure roller 77 is rotatably mounted on arm 74 by means of a stud 78 (best shown in Fig. 7).

When solenoid 45 is energized for the play or record functions, arm 74 pivots in a clockwise direction because of its connection with link 73. Pressure roller 77 is brought into engagement with capstan 60, as best shown in Fig. 13, with tape 8 lying between capstan 60 and the roller. Since pressure roller 77 has friction material on its periphery, the roller is driven by the capstan and together they drive the tape.

A relatively stiff spring 80 extends between a point on link 73 and stud 74*a* of arm 74. The difference in tension between spring 80 and previously mentioned spring 76 is the bias force applied to bring pressure roller 77 into proper engagement with capstan 60. This arrangement eliminates the need for maintaining close tolerances in the linkages between solenoid 45 and arm 74.

When solenoid 45 is deenergized, spring 76 is effective to pivot arm 74 in a counterclockwise direction to thereby withdraw pressure roller 77 from capstan 60, as shown in Fig. 14. This, of course, immediately stops the tape travel.

Deenergizing solenoid 45 also is effective to disengage the friction clutch associated with take-up reel roller 65. Referring to Figs. 2, 8 and 11, one end of a clutch actuating link 90 is pivoted at U-shaped link 71 to solenoid actuated link 70. The other end of link 90 is bent downwardly as shown at 91 (Fig. 8). Short of the downwardly bent end 91, link 90 is provided with an elongated slot 92 (Figs. 2 and 11). The shaft 16*a* of take-up reel roller 65 passes through slot 92, and pulley 66 rests on the top of link 90 at the slot (Fig. 8). Lower plate 50 is punched out as shown at 94 to provide a downwardly inclined cam track aligned with the downwardly bent end 91 of link 90.

Referring to Fig. 8, the elements are shown in the positions they occupy when solenoid 45 is energized for the play or record functions. Links 70 and 90 are in their left hand positions, and the downwardly bent end 91 of link 90 is positioned on the upper surface of plate 50. In this circumstance, link 90 elevates pulley 66 so that friction material 66*a* forms a yielding driving connection between pulley 66 and take-up reel roller 65. As previously mentioned, the precise speed of rotation of roller 65 (and take-up reel 14) is governed by the tape speed (as driven by capstan 60) and the diameter of the tape on the take-up reel.

When solenoid 45 is deenergized, spring 76 moves the various links, including links 70 and 90 to their alternative positions. Thus, links 70 and 90 assume a right hand position, referring to Figs. 2 and 11. In this position, the downwardly bent end 91 of link 90 travels down the cam track 94, thereby allowing pulley 66 to assume a lower position on shaft 16*a*. This, of course, releases the clutch so roller 65 is no longer driven by pulley 66.

Referring to Figs. 5 and 9, the lower end of tubular bearing 61*a* of storage reel roller 61 has an annular groove 102 in which is received a belt 103. Belt 103 extends from bearing 61*a* to a pulley 105 that is carried at the lower end of an upstanding shaft 106. The upper end of shaft 106 carries a worm gear 107 that meshes with a pinion gear 108. The latter actuates a conventional counting mechanism, the face of which is illustrated through opening 26 in Fig. 1. The counting mechanism serves as an indicator for use in indexing the subject matter contained on a particular tape, as previously mentioned.

To summarize, the elements so far described in this section cooperate to drive tape 8 at the proper slow speed for the play and record functions. The tape, as mentioned, is contained on storage reel 9 which in turn is carried on storage reel roller 61. The tape passes from the storage reel through the sound head assembly, later to be described, to capstan 60 and thence to take-up reel 14. When the apparatus is recording or playing, pressure roller 77 is biased toward capstan 60, and the tape, which lies between capstan 60 and pressure roller 77, is moved by reason of the friction between the tape and the rotating capstan and the pressure roller. Belt 68 drives through the friction clutch to rotate take-up reel 14 on which the tape is wound after passing through the sound head. No driving force is applied to storage reel 9 other than that provided by the unwinding tape. Since there is a moderate frictional drag on storage reel 9 because of the above described counting mechanism, there is no tendency of the tape to spill during the record or play functions.

Having thus described the elements that provide the slow speed tape drive during the play and record functions, we next describe the additional elements that are operative to provide the fast speed tape drive during the rewind and rapid forward functions.

*Rewind and rapid forward functions*

Following a recordor play function, it is necessary to return tape 8 from take-up reel 14 to storage reel 9. This return operation is called "rewind," and in our machine it is accomplished at a fast rate of tape travel.

The rapid forward function is provided so that a portion of tape 8 located say in the middle of the tape contained on storage reel 9 may quickly be brought to the periphery of the reel for passage through the sound head. This function, of course, is accomplished by rapidly driving the tape in the forward direction, or from left to right in Fig. 1. The operation is sometimes called "cueing" the tape.

The rewind and rapid forward functions, as previously mentioned, are initiated by actuating knob 25 located at the right on the front of panel 6. For rewind, the knob 25 is manually moved to the left, the direction in which the tape travels in rewind. Conversely, for rapid forward, knob 25 is moved to the right, the direction the tape travels during this function. The correspondence between the directions of knob movement and tape travel, of course, simplifies machine operation and reduces the likelihood of error.

In these two functions, the reel on which the tape is wound is driven at a fast rate. The other or trailing reel, in each case, is subjected to a braking force that maintains the tape under a moderate degree of tension. At the conclusion of a rewind or rapid forward function, the trailing reel is subjected to an increased braking force, but one that is calculated in amount so as to avoid distorting or breaking the tape. Simultaneously with the application of such increased braking force, or shortly thereafter (the precise timing is not critical), the drive connection to the reel on which the tape is being wound is broken. Thus, during the rewind and rapid forward functions, the reels are either being driven or braked, and under these circumstances tape spilling does not and cannot occur. The relatively strong braking at the conclusion of the functions prevents spilling at that time.

Control knob 25 is carried at the end of arm 24 which extends through elongated slot 23 in panel 6 (Fig. 1). Knob 25 and associated arm 24 normally occupy a neutral position, the position midway between the ends of slot 23.

Figure 12:
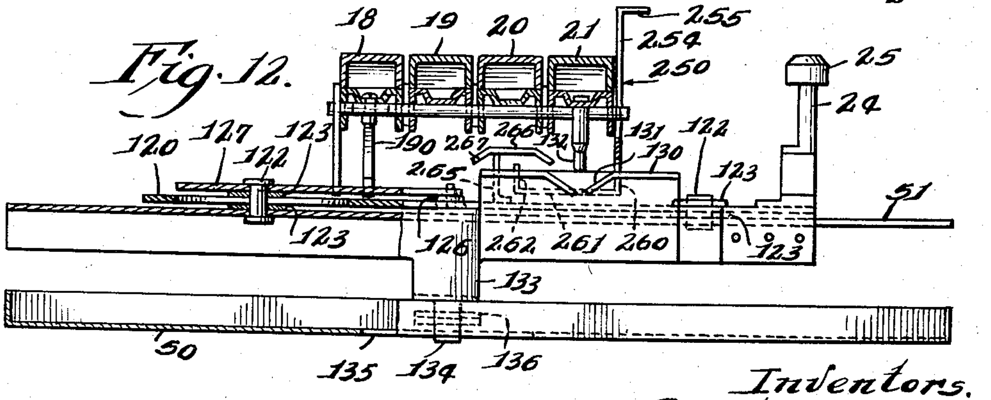
Fig. 12 is a front elevational view, partly in section, taken on line 12—12 of Fig. 11.

Referring to Figs. 2, 11 and 12, arm 24 is carried by an elongated bar 120, which bar has an elongated slot 121 near each end. Upper plate 51 carries a pair of upstanding pins 122 that pass through the respective elongated slots 121 in bar 120. Spaced bearing members 123, best shown in Fig. 12, are mounted on pins 122, and the side edges of the elongated slots 121 in bar 120 are received in the space between members 123. The spacing of pins 122 is such that when bar 120 is in its neutral position, corresponding with the aforesaid neutral position of arm 24 and knob 25, the bearing members 123 are about midway between the ends of the resepctive slots 121. Bearing members 123, of course, support bar 120 and enable the bar to be moved back and forth with minor frictional resistance.

Means are provided to definitely locate bar 120 in its middle, neutral position. In the example illustrated, this means comprises a V-shaped recess 125 (Figs. 2 and 11) in the rear edge of the bar. As shown, recess 125 is located at about the longitudinal center of the bar. The recess 125 provides a cam track that cooperates with a cam roller 126 carried at one end of a lever 127.

Lever 127 is pivoted intermediate its ends on the left hand pin 122, as best shown in Figs. 11 and 12. The other end of lever 127 is connected to a point on upper plate 51 by a spring 128, which spring is effective to bias cam roller 126 against the edge of bar 120 within and in the vicinity of recess 125. The tension of spring 128 is sufficiently great so that when bar 120 has been manually moved from an extreme right or left position toward the neutral middle position, bar 120 is finally centered in the neutral position by the action of biased roller 126 and the V-shaped recess 125.

Bar 120 is provided with a forward extension 130 (Figs. 2, 11 and 12) having portions bent down to form a central depression 131, best shown in Fig. 12. Extension 130 cooperates with a downwardly extending pin 132 (Fig. 12) carried beneath record key 21. Central depression 131 is positioned so that it is directly below pin 132 when bar 120 is in neutral position, the only position in which the machine should be used for the record function. When bar 120 is moved to the right or left, undepressed portions of extension 130 occupy the position directly below pin 132. This interlock or safety arrangement makes it impossible to depress record key 21 when bar 120 is positioned for either the rewind or rapid forward functions. Because subject matter previously on the tape is erased conjointly with recording new matter, it is seen that inability to depress the record key prevents accidental erasing during the rewind or rapid forward functions. Thus this chance for erroneous operation is eliminated.

Referring to Figs. 12 and 16, bar 120 has a lug 133 extending downwardly from the center of its front edge. A reduced, rearwardly offset finger 134 on lug 133 extends through an elongated slot 135 in lower plate 50. Finger 134 is received between the arms of bifurcated front end 136 of a lever 137, which lever extends centrally from the front to the rear of the machine, as best shown in Fig. 11. Lever 137 is pivoted between its ends on pin 72, the same pin that pivotally carries U-shaped link element 71. Rear end 138 of lever 137 is bifurcated, as shown in Fig. 11.

Still referring to Fig. 11, an elongated bar 140 is positioned above the bifurcated rear end 138 of lever 137. Bar 140 has elongated slots 141 near its ends, and it is mounted like bar 120 for longitudinal movement on spaced pins 143 carried by plate 50. A pin 144 (Figs. 11 and 16), extending downwardly from the center of bar 140, is received between the arms of bifurcated end 138 of lever 137.

Thus it is seen that bars 120 and 140 are interconnected by pivoted lever 137 to move in synchronism, but in opposite directions. When bar 120 is moved to the left (for rewind), bar 140 moves to the right, and, conversely, when bar 120 is moved to the right (for rapid forward), bar 140 moves to the left.

Bar 140 (Fig. 11) has three generally V-shaped cam recesses. Two of them, namely, recesses 146 and 147, are spaced a short distance apart and are located centrally in the rear edge of bar 140. The third recess designated 148 is located in the front edge of bar 140 somewhat to the left of center when looking at Fig. 11. The purpose of the recesses 146, 147 and 148 will be described later.

Referring to Fig. 2, a pair of brake assemblies 150 and 151 are symmetrically positioned above bar 140. These brake assemblies operate at various times during the respective functions of our machine, as will be later described. Their most important operation occurs at the conclusion of the rewind and rapid forward functions to avoid tape distortion, breakage, and spill.

Each brake assembly is unique in that the applied braking element exerts a force of relative low magnitude when the element to be braked (roller 61 or roller 65) is rotating in one direction, and it exerts a braking force of relatively high magnitude when the braked element is rotating in the opposite direction. Hence, the brake assemblies have a sense of direction.

Furthermore, each brake assembly, when the high magnitude braking force is applied, is self-energizing, and the said braking force is subject to precise calculation. In the event the element to be braked is rotated with a force exceeding that which the calculated braking force can stop instantaneously, the brake, although it is self-energizing, yields so that the braked element is stopped in a non-abrupt manner. Since the braking force is calculated at a value somewhat less than that which would distort or break the tape, it will be seen that we have eliminated the possibility of tape distortion or breakage when the brakes are applied full force at the end of the high speed rewind and rapid forward functions.

Brake assembly 150 (Fig. 2) comprises a generally L-shaped brake lever 154 which is pivoted intermediate its ends to the left hand pin 143, one of the pins that supports and guides bar 140. One free end of lever 154 carries an upstanding stud 155 on which is rotatably mounted a brake roller 156. The latter has a knurled or other friction periphery, and it is disposed so as to be selectively engageable with the friction material on the periphery of storage reel roller 61, as clearly shown in Fig. 2. The other end of lever 154 terminates in a finger 157, and short of the finger end the lever carries a downwardly projecting pin 158.

Companion brake assembly 151 is similar to the assembly 150. It includes brake lever 160 pivoted on right hand pin 143, upstanding pin 161, brake roller 162 rotatably mounted thereon, finger 163 and downwardly extending pin 164. It will be noted that brake roller 162 is positioned so as to be selectively engageable with the friction material on the periphery of take-up reel roller 65, as best shown in Figs. 3 and 8.

A bias spring 166 extends between the brake levers 154 and 160. As will be seen in Fig. 2, spring 166 applies a force tending to rotate brake lever 154 in a clockwise direction and a force tending to rotate brake lever 160 in a counterclockwise direction. The directions mentioned are those in which the brake levers are moved to apply the brakes.

Brake rollers 156 and 162 are respectively fitted on pins 155 and 161 so that they rotate with a calculated amount of friction. This amount of friction determines the amount of braking force provided by each brake.

As best shown in Fig. 2 with respect to brake assembly 150, the centers of storage reel roller 61 and brake roller 156 lie on a line having an angular relationship of less than 180 degrees with the line connecting the pivotal axis 143 of brake lever 154 and the center of brake roller 156. The same condition is true with respect to brake assembly 151 wherein the centers of take-up reel roller 65 and brake roller 162 lie on a line having an angular relationship of less than 180 degrees with the line connecting the pivotal axis 143 of brake lever 160 and the center of brake roller 162. In other words, in each case the center of the brake roller (156 or 162) is offset from the line between the brake lever pivot 143 and the center of the associated reel roller (61 or 65).

When bar 140 is in its neutral position (as shown in Figs. 2 and 11), the V-shaped recesses 146 and 147 in the rear edge thereof are respectively adjacent the pins 158 and 164 extending downwardly from the two brake levers. Thus the two brake levers thereby are conditioned to be rotated by bias spring 166 so as to apply the brakes. When the brakes are applied, as later described, pins 158 and 164 enter recesses 146 and 147.

During the play and record functions when solenoid 45 is energized, link 73 occupies its rearmost position, as shown in Figs. 2 and 11. The rear end of link 73 has a downwardly bent portion **73*a*, and this portion engages fingers 157 and 163 of the brake levers to position the latter, as best shown in Figs. 2, 3 and 8. At this time bias spring 166 is prevented from rotating the brake levers so as to apply the brakes. When solenoid 45 is deenergized, as it is when stop key 18 is depressed, link 73 is moved forwardly by the action of spring 76, thereby withdrawing downwardly bent portion 73*a* from fingers 157 and 163 of the brake assemblies. In this circumstance (and when bar 140 is in neutral position), bias spring 166 is effective to rotate the brake levers so that brake rollers 156 and 162 are respectively applied to storage reel roller 61 and take-up reel roller 65**.

Before describing the operation of the brake assemblies in connection with the rewind and rapid forward functions, we will first describe certain additional elements that also operate during those functions.

Referring to the right hand side of Fig. 2, a rapid forward intermediate roller 170 is carried by upper plate 51 in a "floating" manner. Roller 170 is rotatably mounted on a vertical shaft 171 which carries at its upper end a pair of spaced disks 172. Upper plate 51 has a relatively large slot 174 therein and the side edges of this slot are received within the space between the disks 172. A spring 176 extends between one of the disks 172 and a point on plate 51 to bias roller 170 toward both the periphery of flywheel 57 and the periphery of take-up reel roller 65. An elevational view of this structure is shown in Fig. 10. When rapid forward intermediate roller 170 engages flywheel 57 and take-up reel roller 65, as next described, the latter is driven at a fast rate.

The positioning of rapid forward intermediate roller 170 is controlled by bias spring 176 and by an L-shaped lever 180. The latter is pivoted at its elbow on a pin 181 (Fig. 10) extending between plates 50 and 51. One leg of L-shaped lever 180 has a finger 182 at its free end, and this finger engages an aperture 183 in one of the disks 172. The free end of the other leg of L-shaped lever 180 has an upstanding pin 185 that passes through arcuate slot 186 in plate 51. It will be noted in Fig. 2 that the rear edge of bar 120 serves as a stop for pin 185, thereby making it impossible when bar 120 is in the indicated position for spring 176 to draw intermediate roller 170 into engagement with flywheel 57 and take-up reel roller 65.

Immediately to the left of pin 185, looking at Fig. 2, the rear edge of bar 120 is provided with a recess 188. This recess forms a cam track that becomes effective when bar 120 is moved to the right, as it is when the rapid forward function is initiated by moving knob 25 to the right. The cam track gradually withdraws the stop from pin 185 so that bias spring 176 can establish the rapid forward drive connection between the periphery of flywheel 57 and take-up reel roller 65. When the connection is made, take-up reel roller 65 is driven in a counterclockwise direction at a fast rate.

Referring to Figs. 2, 11, 12 and 18, we have provided an interlock arrangement whereby the rewind and rapid forward functions may be initiated while the machine is functioning in play or record without first going through the separate step of manually depressing stop key 18.

As best shown in Figs. 12 and 18, a downwardly extending finger 190 is carried by stop key 18. The lower end of finger 190 is adjacent the rear edge of neutralizing lever 127. When bar 120 is moved either to the right or left for respectively initiating the rapid forward or rewind functions, lever 127 rotates in a counterclockwise direction by reason of the action of V-shaped recess 125 on cam roller 126. This rotation of lever 127 causes the rear edge thereof to strike finger 190 and move the finger so as to depress stop key 18. Referring to Figs. 17 and 18, it will be remembered that when stop key 18 is depressed, arm 44 is withdrawn from switch actuator 42 and switch 43 opens to deenergize solenoid 45. Finger 190 is moved sufficiently far so that stop key 18 is held in its down position by latch bar 35, as previously described, and switch 43 remains open.

When solenoid 45 is deenergized, spring 76 moves pressure roller 77 away from capstan 60, and at the same time moves link 73 to its forward position. This frees the downwardly bent portion **73*a* of link 73 from the fingers 157 and 163 of the previously described brake assemblies. Bias spring 166 then rotates the brake levers 154 and 160 so as to apply the brakes respectively to storage reel roller 61 and take-up reel roller 65**.

From the above it will be seen that both the storage reel 9 and the take-up reel 14 are provided with an active braking force at all times that stop key 18 is depressed, and this force is present regardless of whether or not the machine is turned "on" at off-on-volume knob 31. This feature substantially eliminates the possibility of tape spilling caused by outside factors.

The rewind function is initiated by moving knob 25 (Fig. 1) to the left, the direction the tape travels in rewind. This action causes bar 120 to move to the left, and finger 190 will depress stop key 18 if need be, as described above. The movement of bar 120 to the left is transmitted through lever 137 to rear bar 140 which moves to the right. As bar 140 moves to the right from the neutral position illustrated in Fig. 2, V-shaped recess 148 in the front edge thereof moves opposite the pin 64 that extends upwardly from the lever 62, the element that carries storage reel roller 61. Bias spring **64*a* is then able to rotate lever 62 in a counterclockwise direction so that storage reel roller 61 is brought into engagement with upper portion 52*a* of motor roller 52 to establish the rewind drive connection. As motor roller 52 rotates at a relatively fast speed in a counterclockwise direction, it will be seen that this engagement is effective to drive storage reel roller 61 at a fast speed in the clockwise direction, the proper direction for rewinding tape 8** on the storage reel.

Also, when bar 140 moves to the right, the sides of V-shaped recesses 146 and 147 (Fig. 11) in the rear edge thereof engage brake assembly pins 158 and 164. This causes rotation of brake levers 154 and 160 in proper direction to release the brakes from rollers 61 and 65.

Depending on the quantity of tape on take-up reel 14, greater or less driving force is needed on storage reel roller 61 during the rewind function. This fact is utilized by providing a self-energizing relation through the medium of tape 8 between motor roller 52 and storage reel roller 61, and, consequently, bias spring 64*a* need only furnish a small force, i. e. just enough to establish initial engagement of storage reel roller 61 with motor roller portion 52*a*. If there is a considerable quantity of tape on take-up reel 14, the inertia of reel 14 is large and a correspondingly large amount of driving force must be applied to storage reel roller 61. The drag on tape 8 occasioned by this inertia is translated into a force that provides a more intimate relation between storage reel roller 61 and motor roller portion 52*a*; in other words, the drive is self-energizing. With a small quantity of tape on take-up reel 14, the inertia of the reel is less and consequently the drag on the tape is less. However, a correspondingly less amount of driving force is required on storage reel roller 61.

When all or the desired amount of tape 8 is rewound on storage reel 9, knob 25 is returned to the neutral position. This moves rear bar 140 from its right hand position to its neutral position, the position indicated in Fig. 2. In traveling to its neutral position, bar 140, by reason of the cam action of recess 148 on pin 64, moves storage reel roller 61 out of engagement with motor roller portion 52*a*, thereby breaking the drive connection to roller 61. At the same time, the recesses 146 and 147 give clearance to pins 158 and 164 of the brake assemblies, thereby allowing spring 166 to apply the brakes.

The right hand brake assembly 151 is the one that effectively stops the reels at the end of the rewind function. Take-up reel roller 65 is then rotating rapidly in a clockwise direction, the direction that produces the maximum braking force when brake roller 162 is brought into engagement therewith. This maximum braking force, as previously mentioned, is calculated at such a value that storage reel roller 65 is stopped almost instantaneously, but in a non-abrupt manner so there will be no tape distortion or breakage and, of course, no tape spill. Also, brake roller 156 of the other brake assembly is brought into engagement with storage reel roller 61, thereby applying the lesser magnitude braking force to that roller. Thus, at the conclusion of the rewind function, both reels are subjected to a braking force, and these braking forces are effective to retard rotation of the two reels in either and both directions, thereby maintaining the tape in a taut condition, and avoiding spill.

The rapid forward function is initiated by manually moving knob 25 (Fig. 1) to the right, the direction of rapid forward tape travel. This action moves bar 120 to the right to open switch 43, if need be, as previously described. Also, referring to Figs. 2 and 11, moving bar 120 to the right brings recess 188 in the rear edge of the bar opposite pin 185. This makes it possible for bias spring 176 to draw rapid forward intermediate roller 170 into engagement with flywheel 57 and take-up reel roller 65 to establish the rapid forward drive connection.

Simultaneously with establishing the drive connection, rear bar 140 (Fig. 2) moves to the left. The action of the cam tracks of V-shaped recesses 146 and 147 on pins 158 and 164 causes the brake of both brake assemblies to be released, as previously described.

At the conclusion of a rapid forward function, knob 25 and associated bar 120 are moved back to the central, neutral position. Rapid forward intermediate roller 170 is thereby cammed out of driving engagement with flywheel 57 and take-up reel roller 65 to disengage the rapid forward drive connection. At the same time, bar 140 moves to its central, neutral position and spring 166 of the brake assemblies is effective to apply both brakes. In this instance, it is brake assembly 150 that applies its maximum braking force to storage reel roller 61 to stop the tape travel without tape distortion, breakage, or spill, while brake assembly 151 applies its lesser magnitude braking force to take-up reel roller 65. The camming of the brakes is such that the driven reel roller (in both rewind and rapid forward) has its strong brake applied momentarily after the lighter brake is applied to the trailing reel roller. This tends to insure freedom from spill when the tape is stopped.

The sound head assembly of our machine will next be described.

*Sound head assembly*

The sound head assembly is best illustrated in Figs. 13–15. It is located just to the rear of the function keys (Fig. 1).

The sound head assembly is, for the most part, enclosed within previously mentioned housing 13 (Fig. 1) that functions to shield the components thereof from stray electrical pickups. Despite the fact that solenoid 45 and motor 46 are located remotely from the sound head assembly, it has been found that occasional pickup occurs unless shielding is provided.

Housing 13 is mounted on upper plate 51, and it is spaced therefrom by spacers 194 (Fig. 15). A suitable sound head 195 containing the usual erase and record-reproduce coils and cores is positioned within housing 13. The sound head is rigidly mounted on a base plate 196 (Fig. 15), which in turn is adjustably mounted with respect to the housing.

Referring to Figs. 13–15, a pair of spaced non-magnetic pins 197 are carried on the bottom of housing 13. The ends of pins 197 are reduced in cross section, and these reduced ends enter recesses provided in base plate 196 near one edge. An adjusting screw 200 is threaded through plate 196 at the center of the opposite plate edge, and immediately below screw 200 is a non-magnetic element 201 (Fig. 15) against which the screw reacts. Adjustment of screw 200 is effective to vary the angle between base plate 196 and the bottom of housing 13 so that the sound head can be properly oriented with respect to the tape.

Downward pressure is applied to the top of sound head 195 by means of a leaf spring 204 which at one end is secured to a side of housing 13 by screws 205. A non-magnetic member 207 (Fig. 15) extends between the free end of spring 204 and the top of sound head 195. Spring 204 is biased to apply a relatively strong downward force to the sound head so the base plate of the latter is firmly seated on pins 197 and screw 200.

A tape guide 210 is provided on each side of the front of sound head 195. Each guide 210 includes a vertical pin 211 (Fig. 15) positioned to properly direct the tape to and from the sound head 195. Each pin 211 carries an upper L-shaped plate 212 (Fig. 15) that serves to assist in guiding the tape into the sound head during the tape threading operation and a lower horizontal plate 213 on which the bottom edge of the tape rests. The latter plate properly positions the tape vertically with respect to the sound head. Upward movement of the tape during its travel is prevented by the horizontal leg of L-shaped plate 212.

During the record and play functions, the tape is held against the erase and play-record elements of sound head 195 by means of individual pressure pads. A pressure pad 220 (Fig. 14) cooperates with the erase element in the sound head while a pressure pad 221 cooperates with the record-play element. As illustrated, the pressure pads are carried by similarly shaped arms 222 and 223 that pivot on pins 224 and 225 carried on the bottom of housing 13. Arm 222, which carries play-record pressure pad 221, is provided with a spring 228 that biases pad 221 toward the sound head. Similarly, arm 223 has a spring 229 that biases pad 220 toward the sound head. The two arms interlock with each other so that when one of them is moved to disengage its pressure pad from the sound head and tape, the other pressure pad also is disengaged.

The pressure pads and their associated arms move in response to the action of solenoid 45. When the solenoid circuit is broken, the pressure pads are moved out of engagement with the sound head and tape and, conversely, when the solenoid is energized, the pressure pads are moved into engagement with the sound head and tape. The following described mechanism controls the action of the pressure pads.

Arm 74, which carries pressure roller 77, terminates in an arcuate fingerlike extension 232 (Figs. 13 and 14). This extension carries at its free end a downwardly extending pin 233 (Fig. 15) which is received within a slot provided in one end of a link 234 (Fig. 13). Link 234 extends beneath housing 13, and it is pivoted at its opposite end to a pin 235 carried by plate 51. Arm 222 on which pressure pad 221 is mounted has a pin 240 that extends downwardly through a slot in the bottom of housing 13. The lower end of pin 240 is adjacent an edge of link 234.

When pressure roller 77 is out of engagement with capstan 60 (solenoid deenergized) as shown in Fig. 14, ling 234 occupies an extreme clockwise position on its pivot pin 235 (Fig. 15). In this position, link 234 engages pin 240 and holds arm 222 so that pressure pad 221 is out of engagement with the sound head. Because of the aforesaid interlocking relation of the two arms 222 and 223, the arm 223 also is held in a position such that its pressure pad 220 is out of engagement with the sound head.

During the play and record functions (solenoid energized) when pressure roller 77 engages capstan 60, as shown in Fig. 13, link 234 occupies an extreme counterclockwise position and it no longer bears against pin 240. Springs 228 and 229 are then effective to position the two pressure pads against the sound head and tape. When link 234 moves in a counterclockwise direction, the erase pressure pad 220 is the first to make contact with the sound head and tape. After this contact is made, the other pressure pad makes contact. The separate bias springs 228 and 229 insure that both pressure pads properly conform to the sound head. Also, both pressure pads make contact before pressure roller 77 engages capstan 60 to drive the tape.

Because subject matter on the tape is erased during the recording function (when record key 21 is depressed), we have provided a safety lock feature to minimize the possibility of accidental or unwanted erasure. This feature is best illustrated in Figs. 2, 12, 17 and 19.

Referring first to Figs. 17 and 19, a locking element generally designated 250 is disposed below and alongside record key 21. Element 250 is mounted on plate 251 by means of hinges 252. The forward end of element 250 forms a stop 253 which, when the element is positioned on its hinges as shown in Fig. 17, prevents record key 21 from being depressed. The rear end of element 250 has an upwardly extending arm 254 with a manipulator 255 at the top thereof. Army 254 extends through an opening 256 (Fig. 1) in top panel 6 of the housing, so manipulator 255 is exterior of the housing and adjacent to record key 21.

Before record key 21 can be depressed to start the recording function, manipulator 255 must be moved to the right (looking at Figs. 1 and 17) so that element 250 is rotated on its hinges to remove stop 253 from beneath key 21. This act, of course, is premeditated on the part of the user, that is, the user thereby consciously intends to initiate the record function. Thereafter record key 21 can be depressed to actually start the function.

At the conclusion of the record function, the operator usually rewinds the tape and then plays back the material just recorded. Accordingly, we utilize the rewind control of the machine to automatically return element 250 to effective locking position.

Referring to Fig. 12, element 250 has a rear portion 260 that extends downwardly below the level of hinges 252. An arm 261 extends laterally from portion 260, and the free end thereof is bent upwardly to form a finger 262. It will be seen that if element 250 is "unlocked," then finger 262 will be an "up" position, and that if finger 262 is pushed down, element 250 will be returned to effective locking position.

Finger 262 is pushed down by means of a cam arrangement carried by sliding bar 120, the member that is moved to initiate the rewind and rapid forward functions. Still referring to Fig. 12, bar 120 carries an upstanding support member 265 which at its top is provided with a cam strip 266 extending in line with the axis of movement of bar 120. The ends of strip 266 are downwardly inclined as shown at 267 to form cam tracks which are disposed in effective relation with finger 262.

Support member 265 is located on sliding bar 120 so that when the bar is in central, neutral position, the finger 262 is about midway between the cam tracks 267. Assuming finger 262 is in "up" position (safety lock is "off"), movement of sliding bar 120 in either the rewind or the rapid forward direction brings one of the inclined cam tracks 267 into engagement with finger 262. Continued movement of the sliding bar causes finger 262 to be depressed, thereby returning element 250 to effective locking position with stop 253 underneath record key 21. Thereafter, record key 21 cannot be depressed so as to erase the tape without a conscious act on the part of the user, that is, the user must first release the safety lock.

In those few instances where the machine is not operated in rewind or rapid forward following the recording function—in which case the safety lock is not applied automatically, the user can, of course, manually set the lock by actuating manipulator 255.

From the above description it is thought that the construction and advantages of our invention will be readily apparent to those skilled in the art. Various changes in detail may be made without departing from the spirit or losing the advantages of the invention.

Having thus described our invention, what we claim as new and desire to secure by Letters Patent is:

1. In a magnetic recorder-reproducer, a drive and control system for the record medium including a rotatable storage reel roller and a rotatable take-up reel roller, means for selectively driving said storage reel roller at a fast rate for rewind of the record medium and a control therefor, means for selectively driving said take-up reel roller at a fast rate for rapid forward drive of the record medium and a control therefor, and a pair of symmetrical brake assemblies each in effective relation with one of said rollers and operable in response to said controls, each brake assembly comprising a pivoted brake lever, a brake roller on said lever and having a calculated frictional relation therewith, and means biasing said brake lever to effect engagement between said brake roller and the associated reel roller in response to said controls, the brake assembly being self-energizing with respect to said reel roller to provide a calculated high degree of braking force when the reel roller is rotating in one direction and non-self-energizing to provide a low degree of braking force when said reel roller is rotating in the opposite direction.

2. The combination of claim 1 wherein said controls are effective to actuate both brake assemblies substantially simultaneously with stopping the fast drive of either of said reel rollers whereby said rollers are then braked against rotation in either direction by braking forces of amount calculated to prevent distortion of the record medium.

3. In a magnetic recorder-reproducer, a drive and control system for the record medium including a rotatable storage reel roller, a rotatable take-up reel roller and means for selectively driving said rollers at a fast rate, a pair of brake assemblies each in effective relation with one of said rollers, each brake assembly comprising a pivoted brake lever, a brake roller on said lever and having a calculated frictional relation therewith, and means biasing said brake lever to effect engagement between said brake roller and the associated reel roller, the brake assembly being self-energizing with respect to said reel roller to provide a calculated high degree of braking force when the reel roller is rotating in one direction and non-self-energizing to provide a low degree of braking force when the reel roller is rotating in the opposite direction, the difference between the high and low braking forces being an amount calculated to prevent distortion of the record medium.

4. A brake assembly for a magnetic transducer comprising a record medium roller subject to rotation selectively in opposite directions and at different speeds, a brake lever pivoted intermediate its ends and mounted in effective relation with said roller, a stud on one end region of said brake lever, a brake roller mounted for rotation on said stud with a calculated amount of friction against rotation, the peripheral portion of at least one of said rollers being of friction material, and means selectively pivoting said brake lever to move the periphery of said brake roller into and out of engagement with the periphery of said roller, the centers of said roller and said brake roller lying on a line having an angular relationship of less than 180 degrees with the line connecting the pivotal axis of said brake lever and the center of said brake roller, whereby the brake assembly will provide a high braking force when said roller rotates in one direction and a low braking force when the roller rotates in the opposite direction, said brake assembly being self-energizing in said one direction and applying a calculated braking force below that which distorts the record medium, and non-self-energizing in said opposite direction.

5. A brake assembly for a magnetic transducer comprising a record medium roller subject to rotation selectively in opposite directions, a pivoted brake lever mounted in effective relation with said roller, a stud on said brake lever remote from the pivot point, a brake roller mounted for rotation on said stud with a calculated amount of friction against rotation, the peripheral portion of at least one of said rollers being of friction material, and means selectively pivoting said brake lever to move the peripheries of said rollers into and out of engagement with each other, the centers of said roller and said brake roller lying on a line having an angular relationship of less than 180 degrees with the line connecting the pivotal axis of said brake lever and the center of said brake roller whereby the brake assembly will provide a high braking force when said roller rotates in one direction and a low braking force when the roller rotates in the opposite direction, said brake assembly being self-energizing in said one direction and applying a calculated braking force below that which distorts the record medium, and non-self-energizing in said opposite direction.

6. A brake assembly for a magnetic transducer comprising a record medium roller subject to rotation selectively in opposite directions, a pivoted brake lever mounted in effective relation with said roller, a brake roller mounted for rotation on said brake lever with a calculated amount of friction against rotation, the peripheral portion of at least one of said rollers being of friction material, and means selectively pivoting said brake lever to move the peripheries of said rollers into and out of engagement with each other, the centers of said roller and said brake roller lying on a line having an angular relationship of less than 180 degrees with the line connecting the pivotal axis of said brake lever and the center of said brake roller whereby the brake assembly will provide a high braking force when said roller rotates in one direction and a low braking force when the roller rotates in the opposite direction, said brake assembly being self-energizing in said one direction and applying a calculated braking force below that which distorts the record medium, and non-self-energizing in said opposite direction.

7. In magnetic transducer apparatus, an elongated record medium having a tensile characteristic subject to distortion, a pair of reels for said record medium, a pair of rollers connected one to each reel, a pair of brake assemblies each in effective relation with one of said rollers, each brake assembly comprising a pivoted brake lever, a brake roller mounted for rotation on said brake lever with a calculated amount of friction against rotation, and means selectively pivoting said brake lever to move the periphery of said brake roller into and out of engagement with the periphery of the associated reel roller, at least one of the engaging peripheries being of friction material, the center of said brake roller being offset from a line between the brake lever pivot and the center of the associated reel roller, each brake assembly being self-energizing to provide a high braking force when the associated reel roller is rotating in one direction, said high braking force being below the minimum force at which distortion of the record medium occurs, and non-self-energizing to provide a low braking force when said reel roller is rotating in the opposite direction.

References Cited in the file of this patent

UNITED STATES PATENTS

| | | |
|---|---|---|
| 708,128 | Cole et al. | Sept. 2, 1902 |
| 2,086,130 | Hickman | July 6, 1937 |
| 2,099,376 | Shapiro | Nov. 16, 1937 |
| 2,118,347 | Hardenberg | May 24, 1938 |
| 2,267,478 | Stechbart | Dec. 23, 1941 |
| 2,438,222 | Lear | Mar. 23, 1948 |
| 2,464,135 | Hutchison | Mar. 8, 1949 |
| 2,467,507 | Stone | Apr. 19, 1949 |
| 2,535,478 | Ardt et al. | Dec. 26, 1950 |
| 2,537,260 | Dale | Jan. 9, 1951 |
| 2,555,643 | Harrison | June 5, 1951 |
| 2,558,432 | Haloski | June 26, 1951 |
| 2,563,545 | Moreland et al. | Aug. 7, 1951 |
| 2,589,660 | Bauman et al. | Mar. 18, 1952 |
| 2,596,428 | O'Malley | May 13, 1952 |
| 2,609,998 | Sear | Sept. 9, 1952 |
| 2,610,808 | Davis | Sept. 16, 1952 |
| 2,625,337 | Williams | Jan. 13, 1953 |
| 2,626,760 | Chick | Jan. 27, 1953 |
| 2,665,855 | Stone | Jan. 12, 1954 |
| 2,675,185 | Zenner | Apr. 13, 1954 |
| 2,712,448 | Schroter | July 5, 1955 |